United States Patent
Wang

(10) Patent No.: US 8,403,226 B2
(45) Date of Patent: Mar. 26, 2013

(54) CHIP CARD HOLDER

(75) Inventor: You Wang, Shenzhen (CN)

(73) Assignees: Shenzhen Futaihong Precision Industry Co. Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 90 days.

(21) Appl. No.: 12/850,720

(22) Filed: Aug. 5, 2010

(65) Prior Publication Data

US 2011/0180605 A1  Jul. 28, 2011

(30) Foreign Application Priority Data

Jan. 27, 2010  (CN) .......................... 2010 1 0300830

(51) Int. Cl.
*G06K 7/00* (2006.01)
*G06K 7/08* (2006.01)
*G06K 19/00* (2006.01)
*H04M 1/00* (2006.01)
*H05K 1/14* (2006.01)

(52) U.S. Cl. ........ 235/486; 235/451; 235/487; 235/492; 361/737

(58) Field of Classification Search ................. 235/451, 235/487, 492, 486, 482; 361/737; 455/575.1
See application file for complete search history.

(56) References Cited

U.S. PATENT DOCUMENTS

| 7,306,491 | B1 * | 12/2007 | Wei | 439/630 |
| 2005/0215084 | A1 * | 9/2005 | Ho et al. | 439/64 |
| 2009/0241303 | A1 * | 10/2009 | Zhu | 24/591.1 |

FOREIGN PATENT DOCUMENTS

WO  WO 2009057496 A1 *  5/2009

* cited by examiner

*Primary Examiner* — Michael G Lee
*Assistant Examiner* — Laura Gudorf
(74) *Attorney, Agent, or Firm* — Altis Law Group, Inc.

(57) ABSTRACT

An exemplary chip card holder for holding a chip card includes a base member, a card receiving frame and a cover. The card receiving frame is mounted on the base member and defines an accommodating space for receiving the chip card therein. The accommodating space has an inserting opening for inserting the chip card into and removing the chip card out from the accommodating space. The cover includes a resisting block protruding therefrom. The cover is detachably latched to the base member in such a way that the resisting block is aligned with the inserting opening and located adjacent to an end of the chip card to hold the chip card within the accommodating space.

7 Claims, 5 Drawing Sheets

CHIP CARD HOLDER

BACKGROUND

1. Technical Field

The exemplary disclosure relates to chip card holders used in portable electronic devices.

2. Description of Related Art

Portable electronic devices typically use chip card holders for installing chip cards therein. Each chip card holder usually includes a holding frame mounted on the housing of the portable electronic device. The holding frame holds the chip card inside the electronic device. However, this type of holding frame can expose the chip card to other electronic components received in the electronic device. Accordingly, the chip card is subject to electromagnetic interference from the other electronic components.

Therefore, there is room for improvement within the art.

BRIEF DESCRIPTION OF THE DRAWINGS

Many aspects of the present chip card holder can be better understood with reference to the following drawings. The components in the various drawings are not necessarily drawn to scale, the emphasis instead being placed upon clearly illustrating the principles of the present disclosure. Moreover, in the drawings, like reference numerals designate corresponding parts throughout the diagrams.

DETAILED DESCRIPTION

Figure 1:
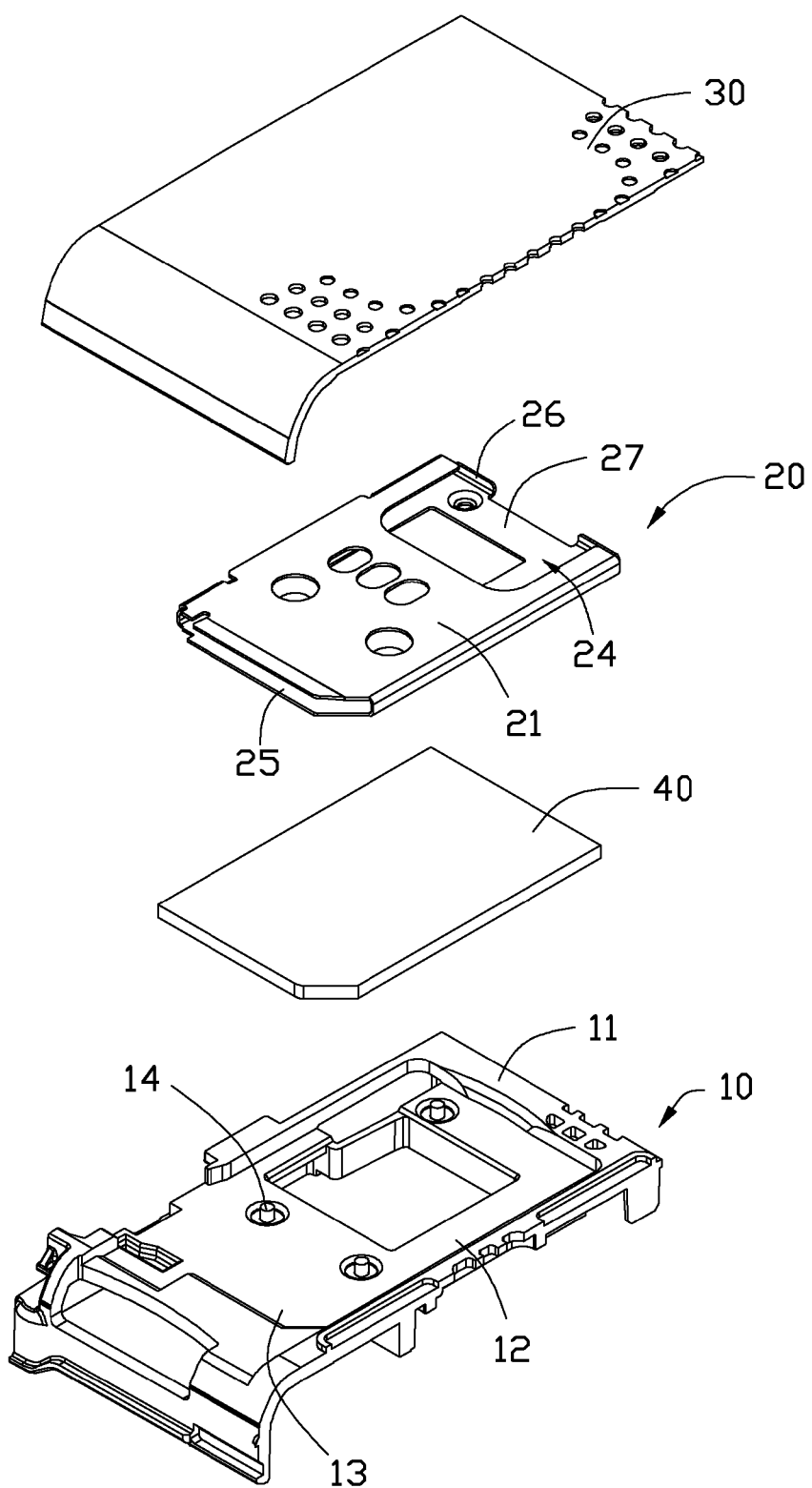
FIG. 1 is an exploded isometric view of a chip card holder in accordance with an exemplary embodiment, together with a chip card, the chip card holder including a latching cover, a card receiving frame and a base member.
Figure 2:
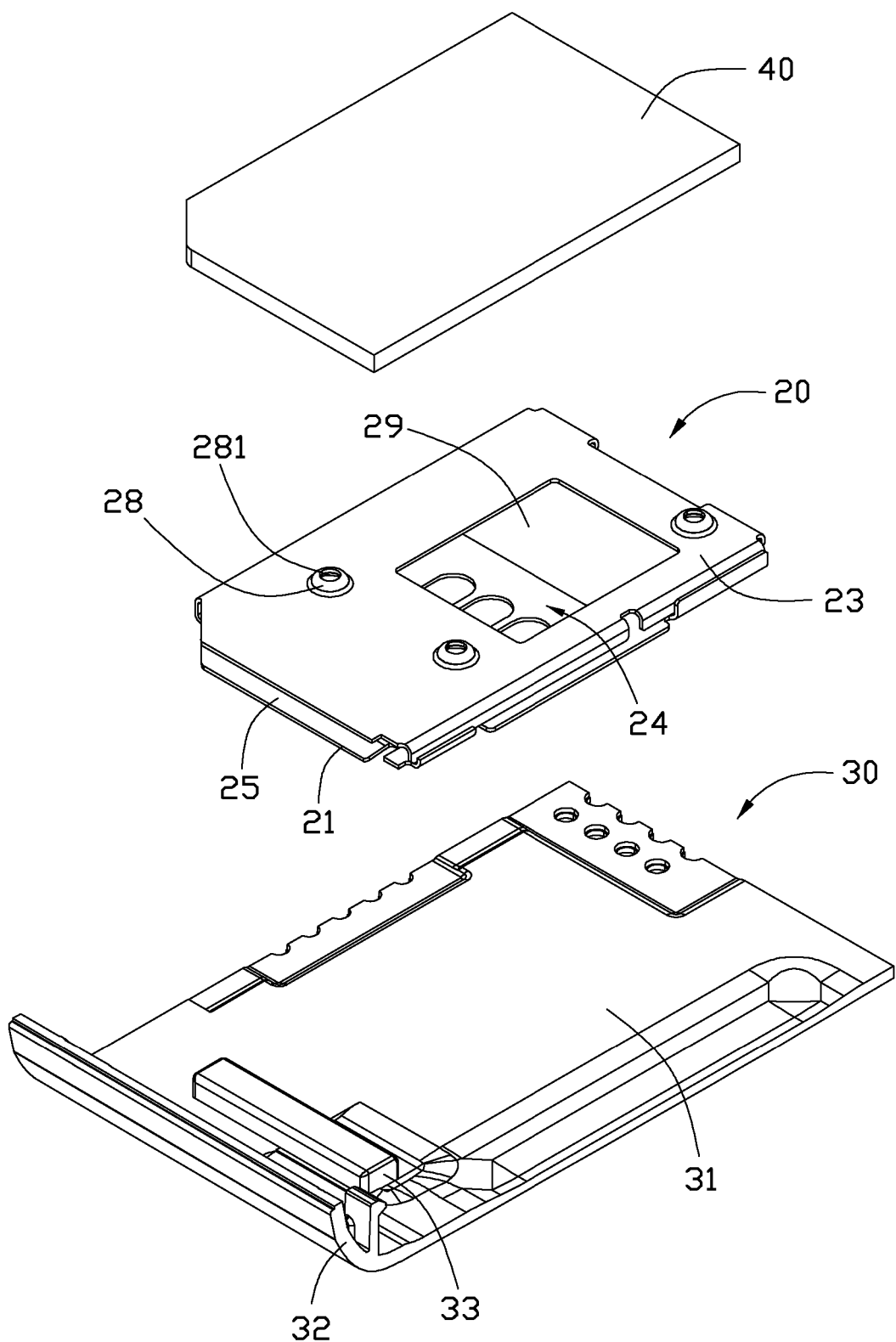
FIG. 2 is similar to the FIG. 1, but viewed from another aspect, and omitting the base member.
Figure 3:
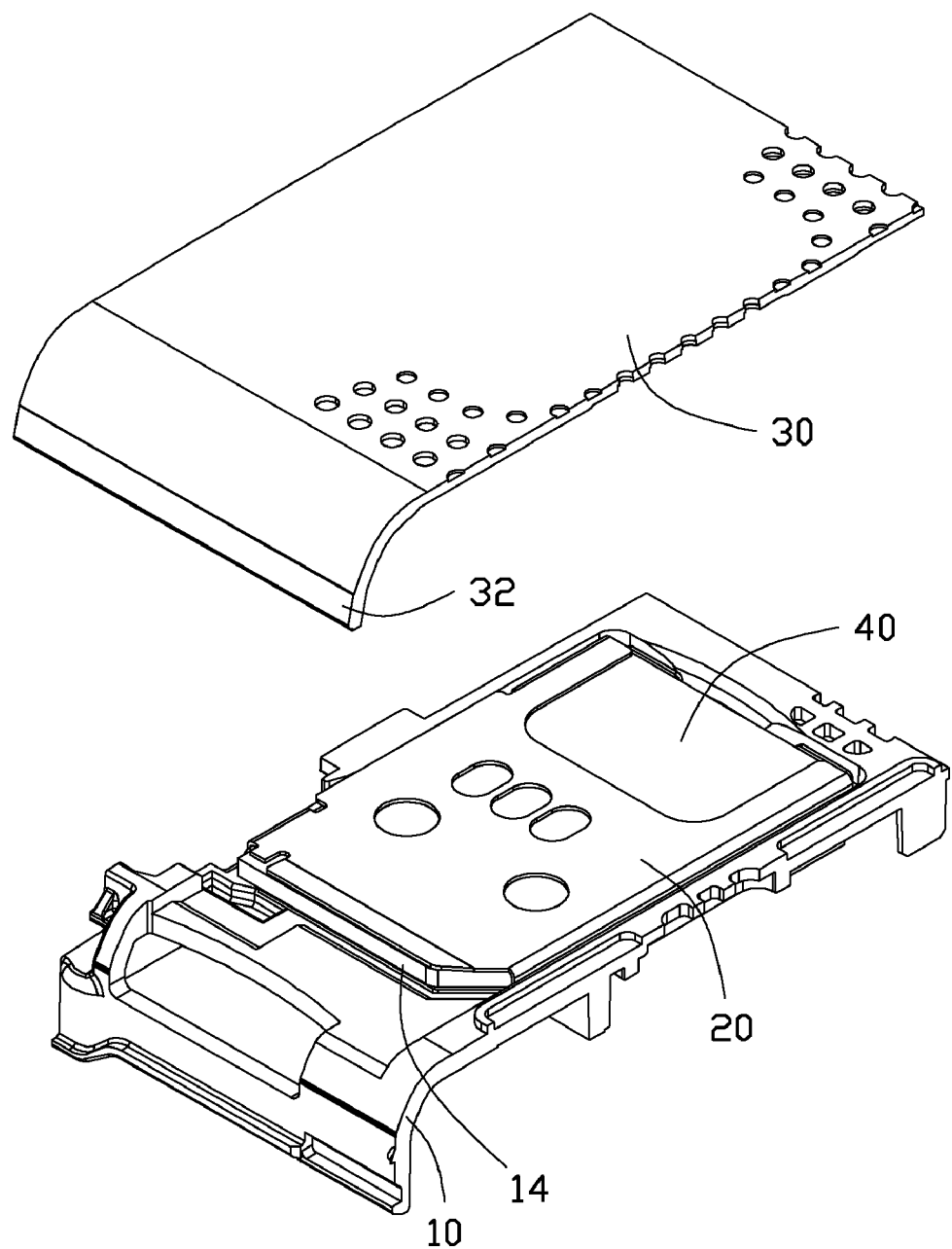
FIG. 3 is a partially assembled view of the chip card holder shown in FIG. 1, wherein the chip card is held within an accommodating space of the card receiving frame.
Figure 4:
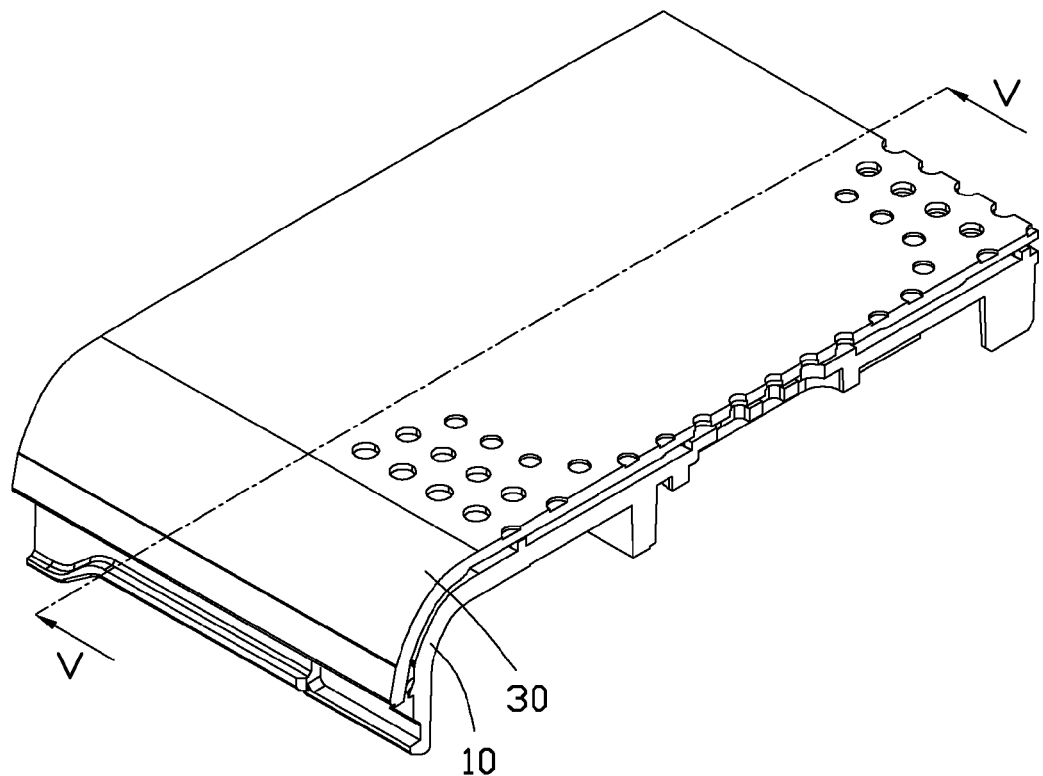
FIG. 4 is a fully assembled view of the chip card holder shown in FIG. 3, with the latching cover of the chip card holder in a closed position.
Figure 5:
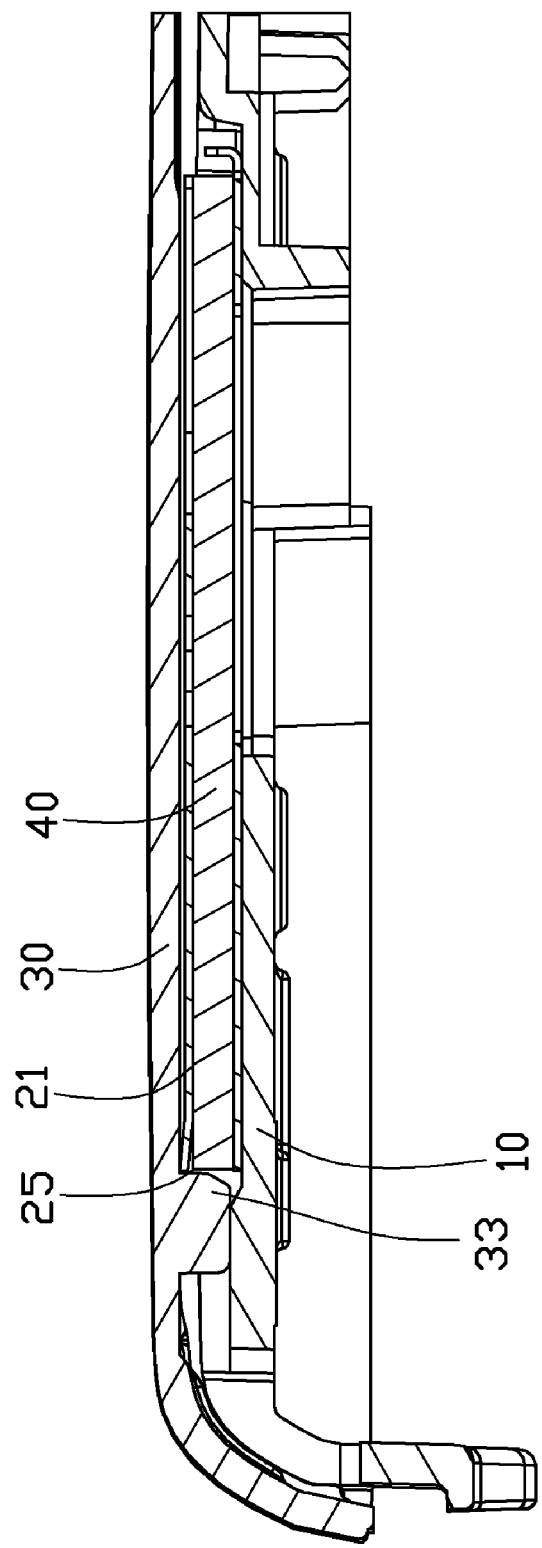
FIG. 5 is a cross-sectional view of the chip card holder shown in FIG. 4, taken along a line V-V thereof.

FIG. 3 and FIG. 4 show an exemplary chip card holder 100 applicable for holding various kinds of chip cards such as a Secure Digital Card (SD card), a Smart Media Card (SM card), and a Subscriber Identity Module Card (SIM card) within a portable electronic device. Further referring to FIG. 1 and FIG. 2, the chip card holder 100 includes a base member 10, a card receiving frame 20 and a latching cover 30. The card receiving frame 20 is mounted on the base member 10, and is for receiving a chip card 40. The latching cover 30 is detachably latched to the base member 10. In the latched position, the latching cover 30 covers the card receiving frame 20 to prevent the chip card 40 from being exposed, and also holds the chip card 40 in position in the card receiving frame 20 (see below).

The base member 10 may be one portion of a housing of the portable electronic device, and has a connector (not shown) mounted thereon for electrically connecting with the chip card 40. The base member 10 includes a top surface 11, and an installing groove 12 recessed from the top surface 11. The installing groove 12 has an opening end 13. Positioning posts 14 are provided beneath a bottom surface of the installing groove 12. The positioning posts 14 extend up as far as the bottom surface of the installing groove 12, such that tops of the positioning posts 14 are substantially coplanar with the bottom surface of the installing groove 12. The positioning posts 14 are configured for securing the card receiving frame 20 to the base member 10 (see below).

The card receiving frame 20 is mounted to and partially accommodated within the installing groove 12 of the base member 10. The card receiving frame 20 includes an upper wall 21 and a lower wall 23 at opposite sides thereof, and a resisting wall 26 adjoining the upper wall 21 and the lower wall 23. The upper and lower walls 21, 23 are parallel to each other. In the illustrated embodiment, the resisting wall 26 is divided into two parts. The upper wall 21, the lower wall 23 and the resisting wall 26 cooperatively define an accommodating space 24 for receiving the chip card 40 therein. The accommodating space 24 includes an inserting opening 25, which is located at an end of the card receiving frame 20 opposite from the resisting wall 26. The inserting opening 25 is for insertion and removal of the chip card 40 into and out from the accommodating space 24. The resisting wall 26 resists against (or abuts) one end of the chip card 40. The distance between the inserting opening 25 and the resisting wall 26 is slightly longer than the chip card 40, such that the chip card 40 can be completely received with the accommodating space 24. A cutout 27 is defined through the upper wall 21 adjacent to the resisting wall 26 (far away from the inserting opening 25). The cutout 27 facilitates easy pushing of the chip card 40 to slide toward the inserting opening 25 and out from the accommodating space 24.

The lower wall 23 includes projections 28 protruding down from an outer surface thereof. Each projection 28 defines a positioning hole 281, which corresponds to a respective positioning post 14 of the base member 10. A connecting aperture 29 is defined through the lower wall 23, for facilitating the chip card 40 to be electrically connected with a circuit board (not shown) within the portable electronic device.

The latching cover 30 may be a battery cover of the portable electronic device, and is detachably latched to the base member 10 for covering the card receiving frame 20. The latching cover 30 includes a main cover 31, and an end wall 32 extending from one end of the main cover 31. A resisting block 33 protrudes from the inner surface of the main cover 31, corresponding to the inserting opening 25 of the card receiving frame 20. The resisting block 33 is configured for being aligned with the inserting opening 25, and thus being located at an end of the chip card 40 to hold the chip card 40 within the accommodating space 24.

Referring to FIG. 3 and FIG. 4, in assembly and use of the chip card holder 100, the card receiving frame 20 is mounted on the base member 10 and partially accommodated within the installing groove 12 of the base member 10. The positioning posts 14 pass through and latch into the corresponding positioning holes 281 of the card receiving frame 20. The inserting opening 25 of the card receiving frame 20 aligns with the opening end 13 of the base member 10, such that the chip card 40 can be inserted into the opening end 13 and be completely received within the accommodating space 24 of the card receiving frame 20. After that, the latching cover 30 is detachably latched to the base member 10 in such a way that the main cover 31 is positioned upon the upper wall 21 of the card receiving frame 20, and the resisting block 33 is aligned with the inserting opening 25. In particular, the resisting block 33 is located adjacent to an end of the chip card 40, to hold the chip card 40 within the accommodating space 24. Accordingly, the assembly of the chip card holder 100 together with the chip card 40 is finished.

It is to be understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A chip card holder for a portable electronic device, comprising:
   a base member including a plurality of positioning posts;
   a card receiving frame separable from the base member and including a first wall, a second wall opposite to the first wall and a resisting wall, the first wall being parallel to the second wall, the first wall, the second wall and the resisting wall cooperatively defining an accommodating space for receiving a chip card therein, the accommodating space having an inserting opening for inserting the chip card into and removing the chip card out from the accommodating space, the second wall defining a plurality of positioning holes, the positioning posts latched into the positioning holes to mount the card receiving frame to the base member, the resisting wall abutting against one end of the chip card; and
   a battery cover for shielding a battery inside the portable electronic device, the battery cover including a flat main cover and an end wall extending from one end of the main cover, the flat main cover abutting against the first wall of the card receiving frame, a resisting block protruding from the main cover, the battery cover detachably latched to the base member in such a way that the resisting block is aligned with the inserting opening and located adjacent to a second end of the chip card to hold the chip card within the accommodating space.

2. The chip card holder of claim 1, wherein the inserting opening is at one end of the card receiving frame opposite from the resisting wall.

3. The chip card holder of claim 2, wherein the distance between the inserting opening and the resisting wall is slightly longer than the chip card such that the chip card can be completely received with the accommodating space.

4. The chip card holder of claim 2, wherein the base member includes a top surface and an installing groove recessed from the top surface, and the installing groove has an opening end; and the card receiving frame is accommodated within the installing groove of the base member to leave a space, with the inserting opening of the card receiving frame facing the opening end of the base member, the resisting block is received in the space and abuts against the inserting opening of the card receiving frame.

5. The chip card holder of claim 2, wherein the first wall defines a cutout therethrough adjacent to the resisting wall for facilitating easy pushing of the chip card to slide toward the inserting opening and out from the accommodating space.

6. The chip card holder of claim 4, wherein the positioning posts are provided beneath a bottom surface of the installing groove; and the second wall includes projections protruding down from an outer surface thereof, and each projection defines the positioning hole receiving a respective positioning post of the base member therein.

7. A chip card holder for a portable electronic device, comprising:
   a base member defining an installing groove with an opening end; a plurality of positioning posts formed in the installing groove;
   a card receiving frame including a first wall, a second wall opposite to the first wall and a resisting wall, the first wall being parallel to the second wall, the first wall, the second wall and the resisting wall cooperatively defining an accommodating space for receiving a chip card therein, the accommodating space having an inserting opening for inserting the chip card into and removing the chip card out from the accommodating space, the second wall defining a plurality of positioning holes; the card receiving frame accommodated within the installing groove of the base member to leave a space, the positioning posts latched into the positioning holes to mount the card receiving frame to the base member, the resisting wall abutting against one end of the chip card; and
   a cover including a flat main cover and an end wall extending from one end of the main cover, the flat main cover abutting against the first wall of the card receiving frame, a resisting block protruding from the main cover, the cover detachably latched to the base member, the resisting block received in the space and abutting against the inserting opening of the card receiving frame located adjacent to a second end of the chip card to hold the chip card within the accommodating space.

* * * * *